(12) United States Patent
Shinobu

(10) Patent No.: US 11,860,510 B2
(45) Date of Patent: Jan. 2, 2024

(54) OBSERVATION DEVICE AND IMAGE PICKUP APPARATUS INCLUDING THE SAME

(71) Applicant: CANON KABUSHIKI KAISHA, Tokyo (JP)

(72) Inventor: Fumihiro Shinobu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/060,662

(22) Filed: Dec. 1, 2022

(65) Prior Publication Data

US 2023/0114678 A1  Apr. 13, 2023

Related U.S. Application Data

(63) Continuation of application No. 16/697,253, filed on Nov. 27, 2019, now Pat. No. 11,543,734.

(30) Foreign Application Priority Data

Dec. 4, 2018 (JP) ................................ 2018-226995

(51) Int. Cl.
*G03B 13/06* (2021.01)
*G02B 13/18* (2006.01)
(Continued)

(52) U.S. Cl.
CPC .............. *G03B 13/06* (2013.01); *G02B 9/34* (2013.01); *G02B 13/18* (2013.01); *H04N 23/53* (2023.01)

(58) Field of Classification Search
CPC .......... G03B 13/06; H04N 23/53; G02B 9/34; G02B 13/18
(Continued)

(56) References Cited

U.S. PATENT DOCUMENTS

2014/0340558 A1* 11/2014 Nakahara ................. G02B 9/16
348/333.08
2015/0177509 A1  6/2015 Sato
2015/0212289 A1  7/2015 Matsuo

FOREIGN PATENT DOCUMENTS

JP  H06194583 A  7/1994
JP  2012-068302 A  4/2012
(Continued)

OTHER PUBLICATIONS

Notice of Reasons for Refusal issued by the Japan Patent Office dated Nov. 15, 2022 in corresponding JP Patent Application No. 2022-175806, with English translation.
(Continued)

*Primary Examiner* — Wyatt A Stoffa
*Assistant Examiner* — Mitchell T Oestreich
(74) *Attorney, Agent, or Firm* — Carter, DeLuca & Farrell LLP

(57) ABSTRACT

An observation device according to the present invention includes an image display element displaying an image, and a finder optical system used for observing the image displayed on an image display surface of the image display element. The finder optical system includes a positive first lens, a negative second lens, and a biconvex positive third lens arranged in this order from the image display surface side to the observation side. A focal length of the second lens, a focal length of the finder optical system, a curvature radius of a lens surface of the second lens on the image display surface side, a curvature radius of a lens surface of the second lens on the observation side, a diagonal length of the image display surface, and a curvature radius of a lens surface of the third lens on the image display surface side are appropriately set.

5 Claims, 15 Drawing Sheets

(51) Int. Cl.
*G02B 9/34* (2006.01)
*H04N 23/53* (2023.01)

(58) Field of Classification Search
USPC .......................................................... 359/715
See application file for complete search history.

(56) References Cited

FOREIGN PATENT DOCUMENTS

| | | |
|---|---|---|
| JP | 2013-088632 A | 5/2013 |
| JP | 2013250506 A | 12/2013 |
| JP | 2016-001209 A | 1/2016 |
| JP | 2016166969 A | 9/2016 |
| JP | 2016-224238 A | 12/2016 |
| JP | 2016224239 A | 12/2016 |
| JP | 2017-177425 A | 10/2017 |
| JP | 2018-189879 A | 11/2018 |
| WO | 2013-099181 A1 | 7/2013 |
| WO | 2013-115127 A1 | 8/2013 |

OTHER PUBLICATIONS

Notice of Reasons for Refusal issued by the Japan Patent Office dated Jul. 26, 2022 in corresponding JP Patent Application No. 2018-226995, with English translation.

* cited by examiner

OBSERVATION DEVICE AND IMAGE PICKUP APPARATUS INCLUDING THE SAME

BACKGROUND OF THE INVENTION

Cross Reference to Related Applications

This application is a continuation of U.S. patent application Ser. No. 16/697,253, filed on Nov. 27, 2019, which claims the benefit of and priority to Japanese Patent Application No. 2018-226995, filed Dec. 4, 2018, each of which is hereby incorporated by reference herein in their entirety.

FIELD OF THE INVENTION

The present invention relates to an observation device and an image pickup apparatus including the observation device, which are favorable for observation of an image displayed on an image display element in an electronic viewfinder used for a video camera, a still camera, and a broadcast camera, for example.

DESCRIPTION OF THE RELATED ART

There has been known an observation device using a finder optical system with a plurality of lenses to observe an image displayed on an image display element such as a liquid crystal panel. In order to enhance the visibility, the finder optical system is required to have a sufficiently large field of view (high magnification) and a long eye relief (a distance from a lens surface on the observation side to an observation surface (eye point)) and to correct various aberrations satisfactorily.

Particularly, along with the trend toward the higher pixel resolution of digital cameras, there has been a demand for a finder optical system with high magnification particularly for enhancing the visibility.

The already-known finder optical system with high magnification includes three lenses, which are a lens with a positive refractive power, a lens with a negative refractive power, and a lens with a positive refractive power, arranged in this order from the image display surface side (the observed object side) to the eye point side (the observer side).

US Patent Application Publication No. 2015/0212289 discloses an eyepiece optical system in which a coma and a distortion are corrected satisfactorily. The eyepiece optical system disclosed in US Patent Application Publication No. 2015/0212289 includes a first lens with a positive refractive power, a second lens with a negative refractive power having a concave surface on the image display surface side, and a third lens with a positive refractive power having a convex surface on the eye point side, and the curvatures of the lens surfaces of the third lens and the focal length of the entire eyepiece optical system are set appropriately.

US Patent Application Publication No. 2014/0340558 discloses an eyepiece optical system in which the viewing angle is wide and various aberrations are corrected satisfactorily. The eyepiece optical system disclosed in US Patent Application Publication No. 2014/0340558 includes a first lens with a positive refractive power, a second lens with a negative refractive power, and a biconvex third lens with a positive refractive power, and the focal lengths of the first lens, the second lens, and the entire system are set appropriately.

US Patent Application Publication No. 2015/0177509 discloses an eyepiece optical system that has a small size with a sufficiently wide viewing angle and optical performance high enough for the higher pixel resolution. The eyepiece optical system disclosed in US Patent Application Publication No. 2015/0177509 includes a first lens with a positive refractive power, a second lens with a negative refractive power, and a biconvex third lens with a positive refractive power, and it is disclosed that highly refractive material is used for each lens.

In order for the finder optical system used for the observation device to secure both the wide viewing angle and the long eye relief, it is important to appropriately set the lens configuration of the finder optical system and the features of each lens such as the refractive power and the lens shape. Besides, when an image display element including a small image display surface is used, it is important to appropriately set, for example, the ratio of the refractive power of the finder optical system to the size of the image display surface.

For example, it is difficult to obtain a wide viewing angle without appropriate setting of the refractive power of each lens. Additionally, it is difficult to obtain a long eye relief without appropriate curvature radii of the lens surfaces of each lens.

SUMMARY OF THE INVENTION

An object of the present invention is to provide an observation device that allows both observation of an image on an image display surface with a wide viewing angle and securing of a long eye point while correcting various aberrations satisfactorily to achieve high optical performance.

The observation device according to the present invention includes an image display element that displays an image, and a finder optical system that is used for observing the image displayed on an image display surface of the image display element. The finder optical system includes a first lens with a positive refractive power, a second lens with a negative refractive power, and a third lens with a positive refractive power arranged in this order from an image display surface side to an observation side in which the third lens is biconvex. The observation device satisfies the following conditional expressions:

$$-0.70 < f2/f < -0.20;$$

$$0.7 < (R22+R21)/(R22-R21) < 1.4;$$

$$0.31 < H/f < 0.50; \text{ and}$$

$$0.000 \leq (R31-R22)/(R31+R22) < 10.0,$$

where f2 is a focal length of the second lens, f is a focal length of the finder optical system, R21 is a curvature radius of a lens surface of the second lens on the image display surface side, R22 is a curvature radius of a lens surface of the second lens on the observation side, H is a half of a diagonal length of the image display surface, and R31 is a curvature radius of a lens surface of the third lens on the image display surface side.

Further features of the present invention will become apparent from the following description of exemplary embodiments with reference to the attached drawings.

DESCRIPTION OF THE EMBODIMENTS

An observation device including a finder optical system according to examples of the present invention is described below. The observation device of the present invention includes an image display element that displays an image and a finder optical system that is used for observation of the image displayed on an image display surface of the image display element.

The finder optical system according to each of the examples is used for observation of the image displayed on the image display surface. The finder optical system according to each example includes a first lens with a positive refractive power, a second lens with a negative refractive power, and a third lens with a positive refractive power arranged in this order from the image display surface side to the observation side. The finder optical system according to each example may include a fourth lens with a positive or negative refractive power on the observation side of the third lens.

Figure 1:
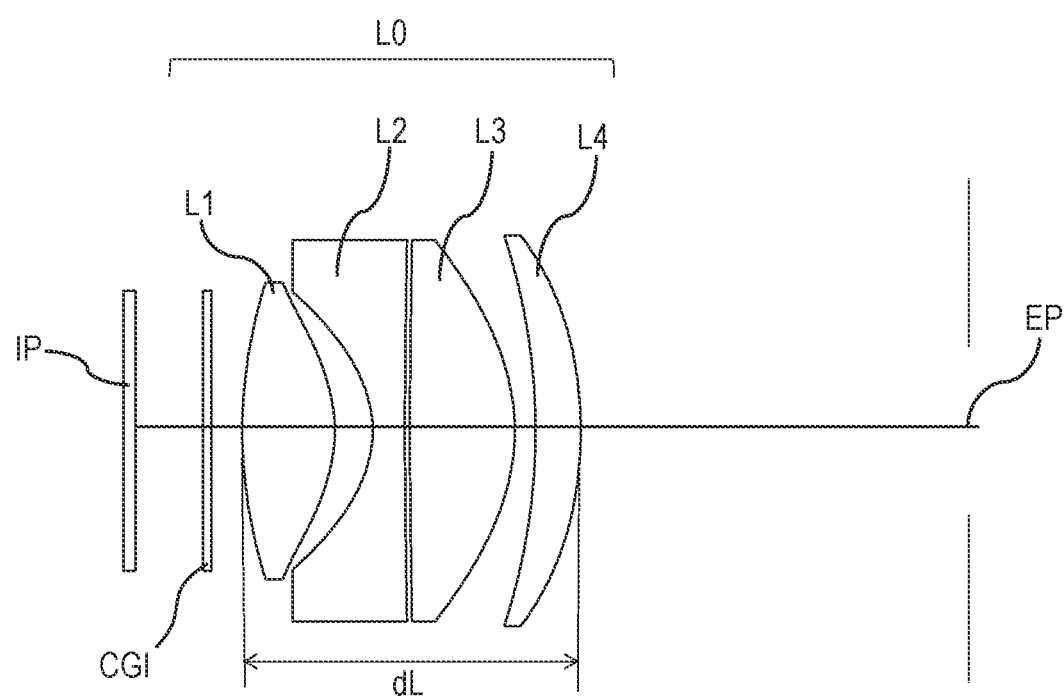
FIG. 1 is a cross-sectional view of a finder optical system according to an observation device of Example 1.

FIG. 1 is a lens cross-sectional view of an observation device of Example 1.

Figure 2:
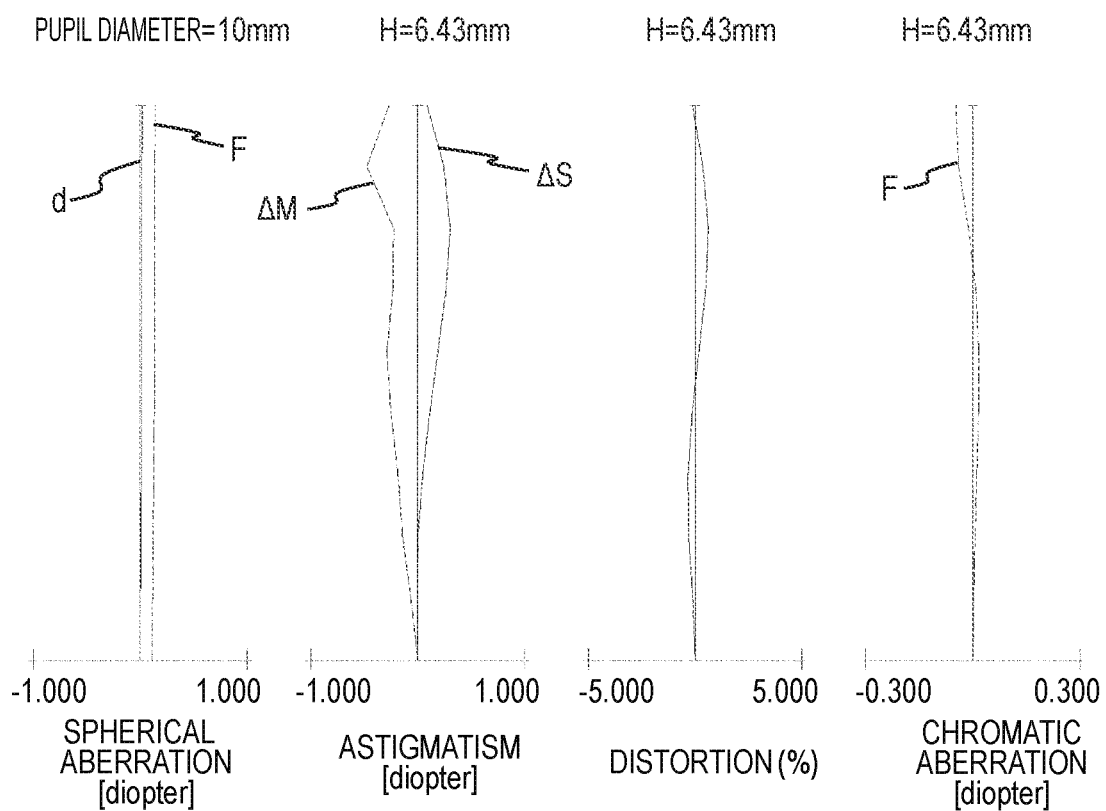
FIG. 2 shows aberration diagrams of the finder optical system according to the observation device of Example 1.

FIG. 2 shows aberration diagrams of a finder optical system according to Example 1 in which the diopter thereof is −1.0 (the standard diopter).

Figure 3:
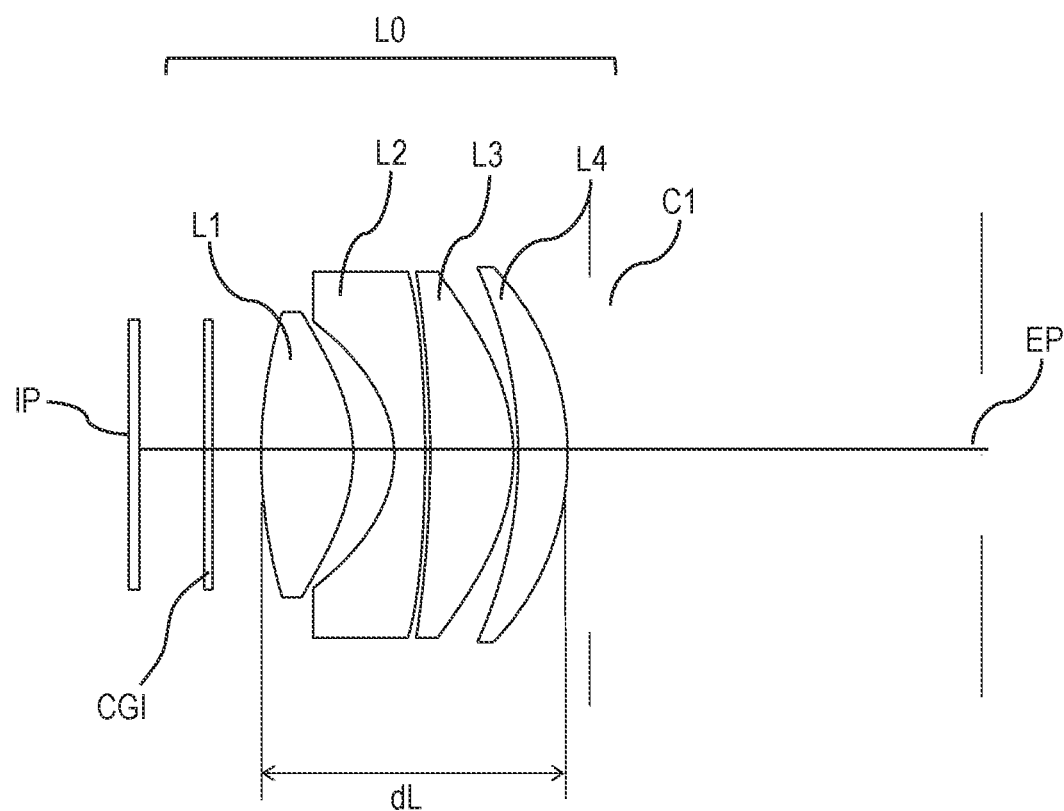
FIG. 3 is a cross-sectional view of a finder optical system according to an observation device of Example 2.

FIG. 3 is a lens cross-sectional view of an observation device of Example 2.

Figure 4:
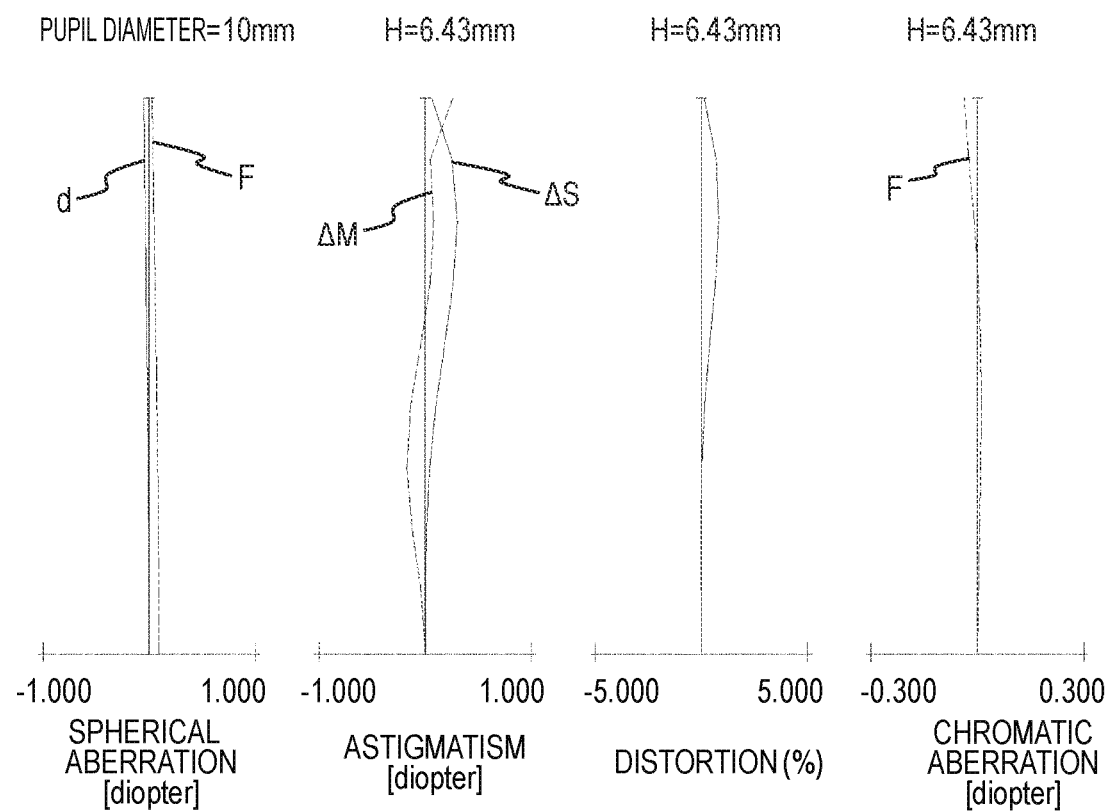
FIG. 4 shows aberration diagrams of the finder optical system according to the observation device of Example 2.

FIG. 4 shows aberration diagrams of a finder optical system according to Example 2 in which the diopter thereof is −1.0.

Figure 5:
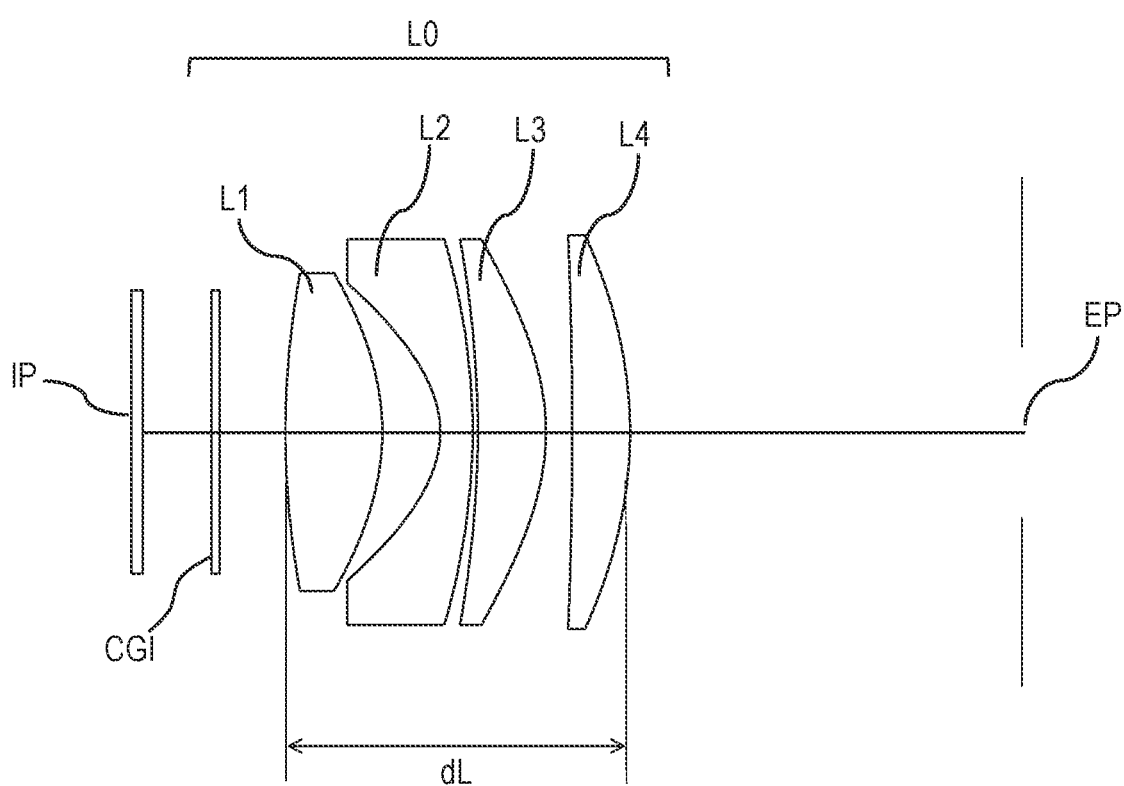
FIG. 5 is a cross-sectional view of a finder optical system according to an observation device of Example 3.

FIG. 5 is a lens cross-sectional view of an observation device of Example 3.

Figure 6:
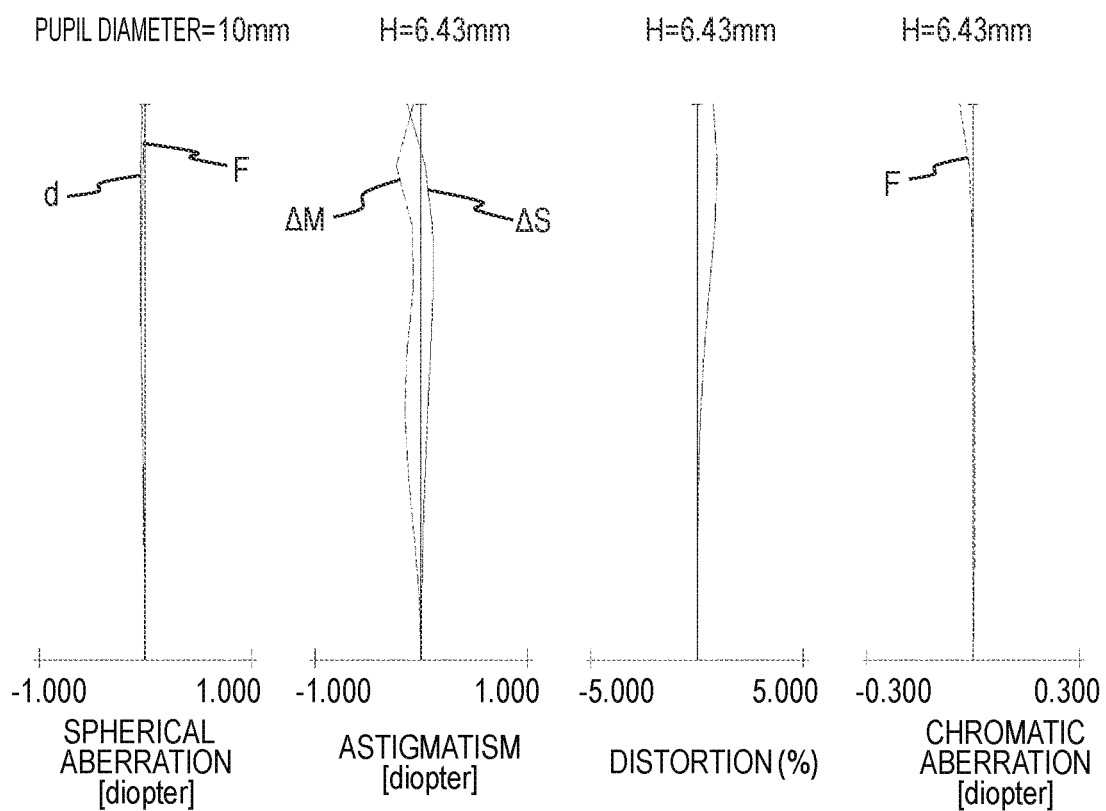
FIG. 6 shows aberration diagrams of the finder optical system according to the observation device of Example 3.

FIG. 6 shows aberration diagrams of a finder optical system according to Example 3 in which the diopter thereof is −1.0.

Figure 7:
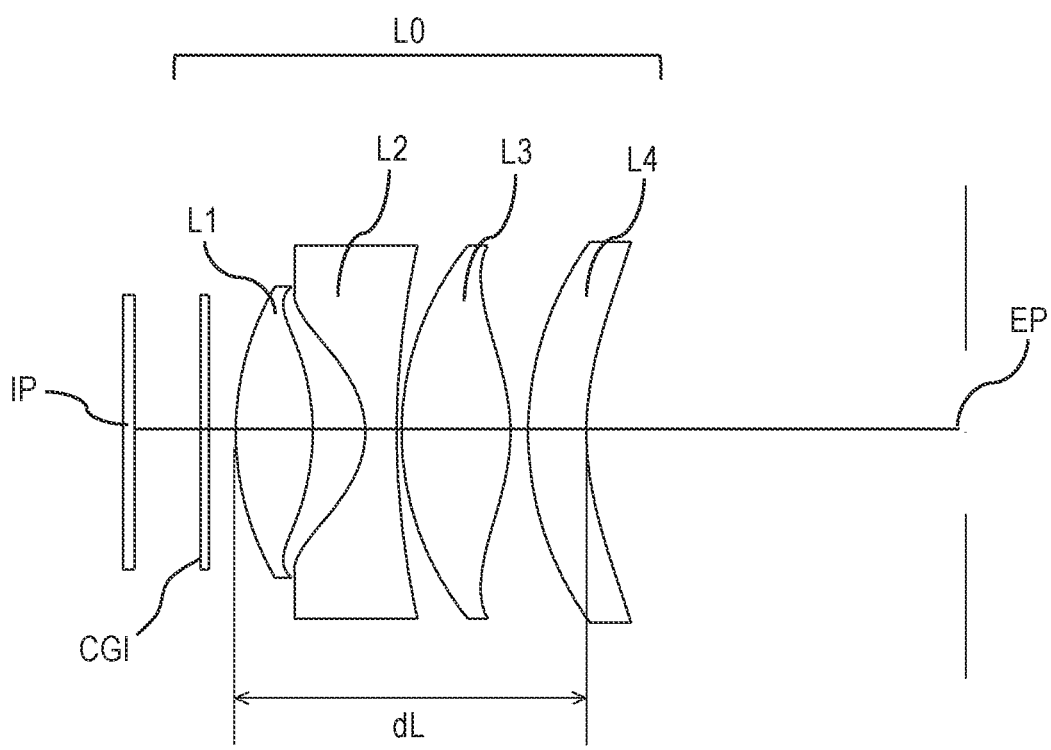
FIG. 7 is a cross-sectional view of a finder optical system according to an observation device of Example 4.

FIG. 7 is a lens cross-sectional view of an observation device of Example 4.

Figure 8:
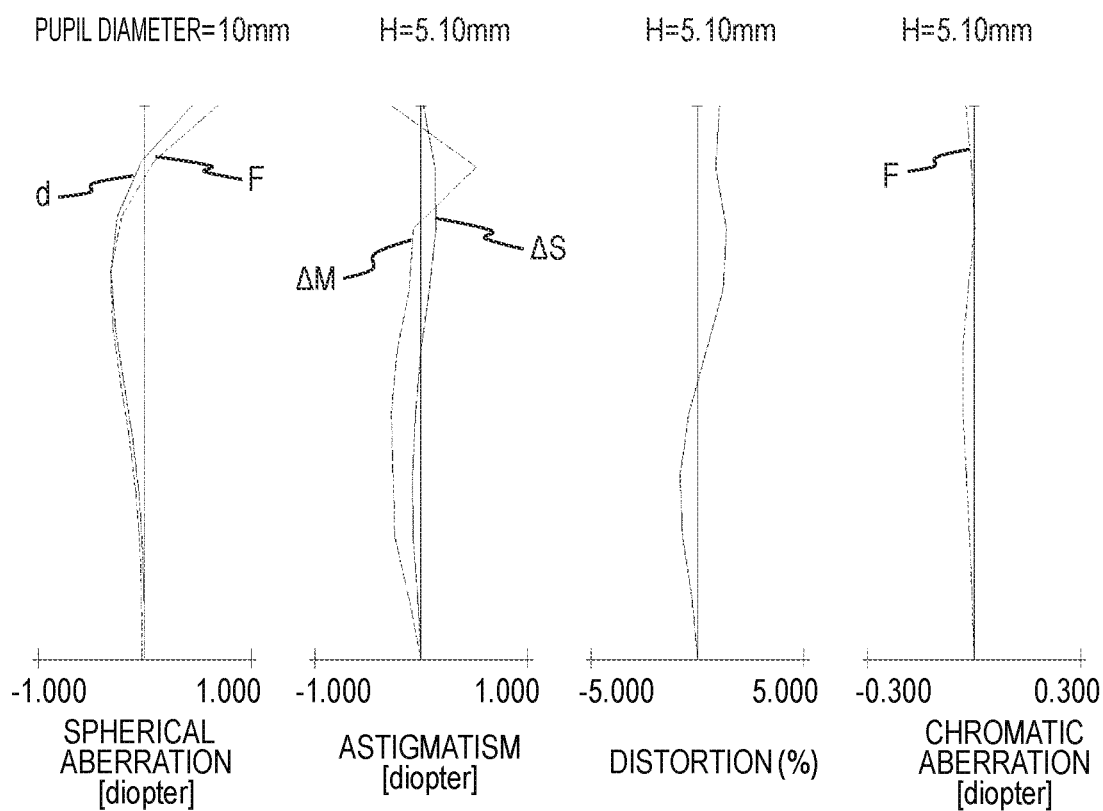
FIG. 8 shows aberration diagrams of the finder optical system according to the observation device of Example 4.

FIG. 8 shows aberration diagrams of a finder optical system according to Example 4 in which the diopter thereof is −1.0.

Figure 9:
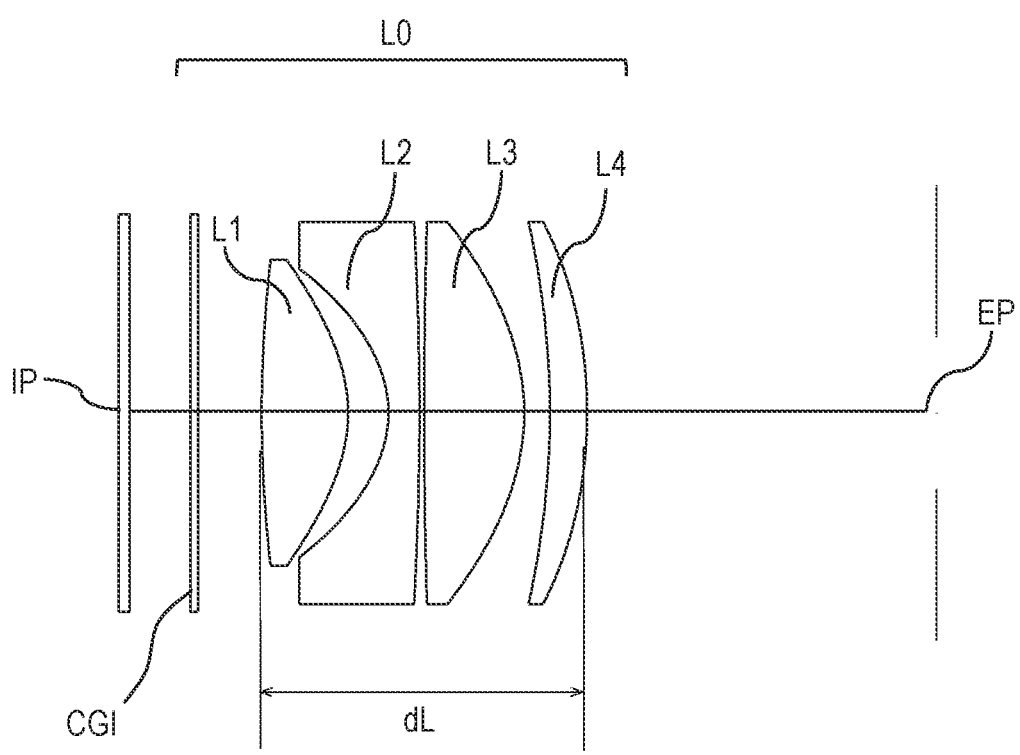
FIG. 9 is a cross-sectional view of a finder optical system according to an observation device of Example 5.

FIG. 9 is a lens cross-sectional view of an observation device of Example 5.

Figure 10:
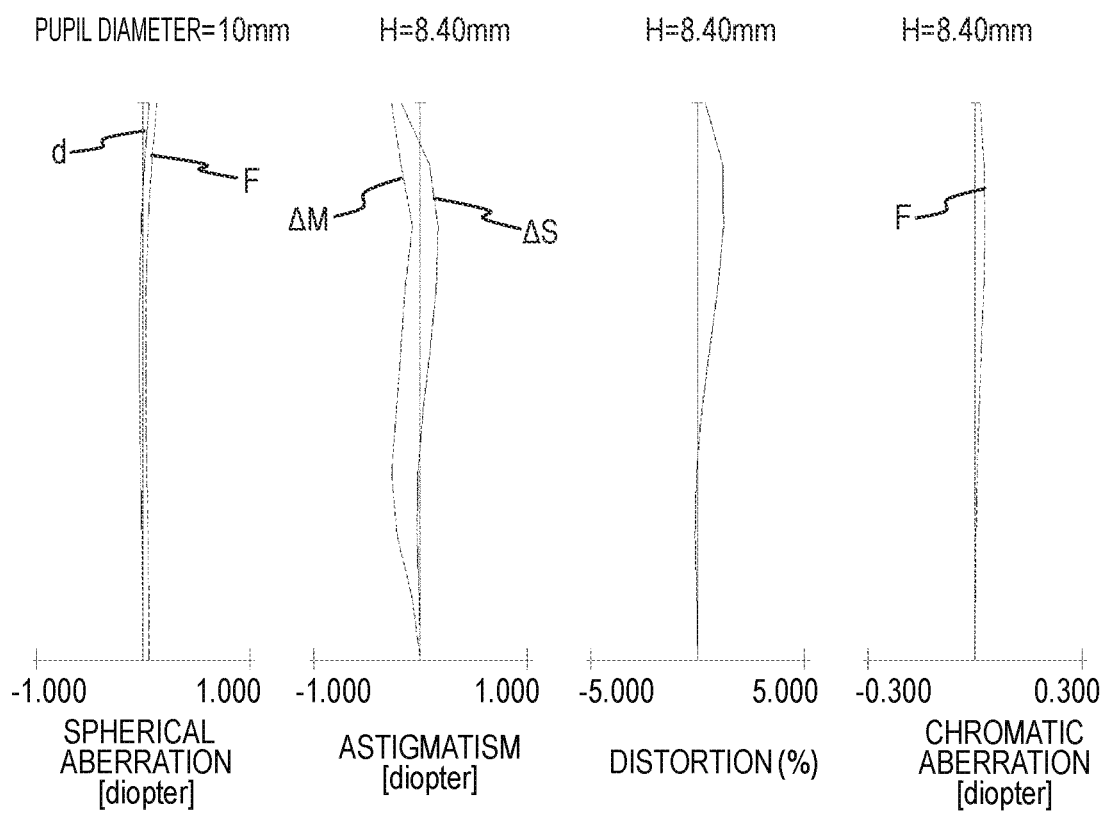
FIG. 10 shows aberration diagrams of the finder optical system according to the observation device of Example 5.

FIG. 10 shows aberration diagrams of a finder optical system according to Example 5 in which the diopter thereof is −1.0.

Figure 11:
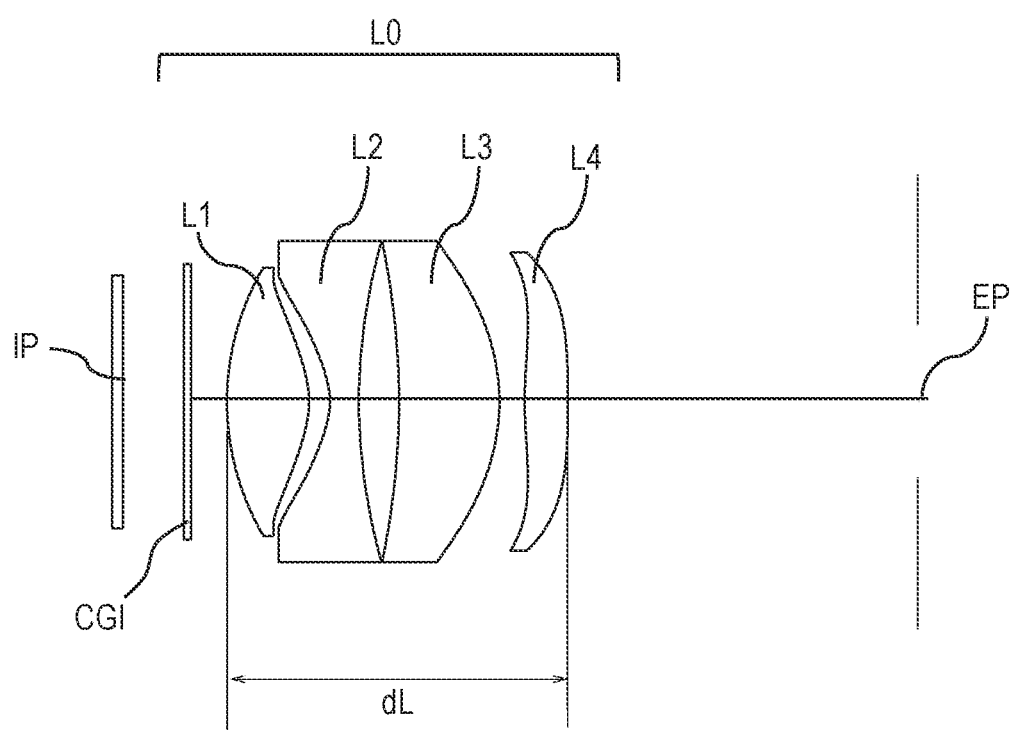
FIG. 11 is a cross-sectional view of a finder optical system according to an observation device of Example 6.

FIG. 11 is a lens cross-sectional view of an observation device of Example 6.

Figure 12:
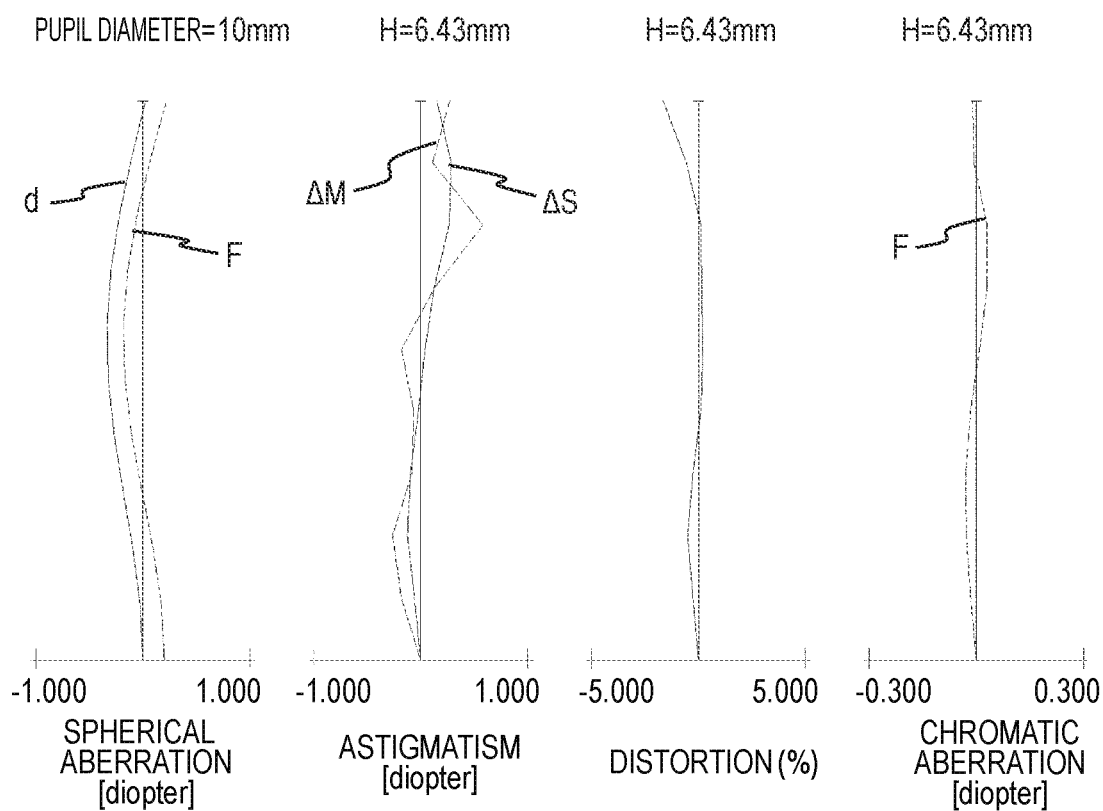
FIG. 12 shows aberration diagrams of the finder optical system according to the observation device of Example 6.

FIG. 12 shows aberration diagrams of a finder optical system according to Example 6 in which the diopter thereof is −1.0.

Figure 13:
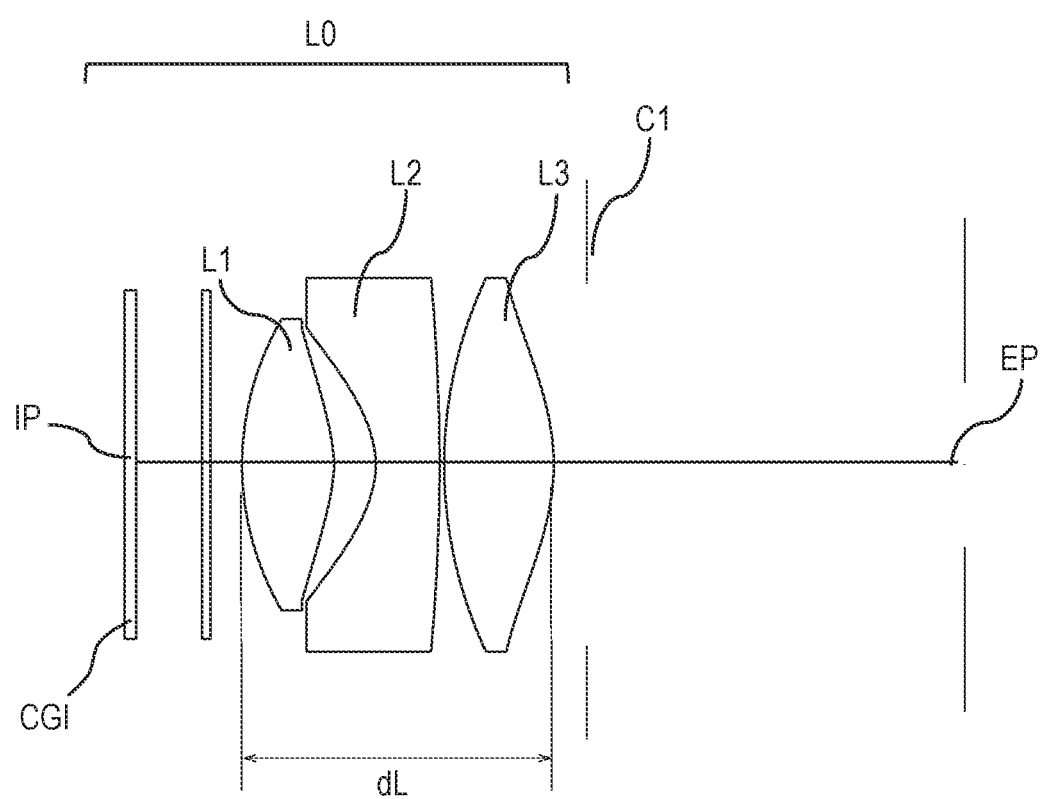
FIG. 13 is a cross-sectional view of a finder optical system according to an observation device of Example 7.

FIG. 13 is a lens cross-sectional view of an observation device of Example 7.

Figure 14:
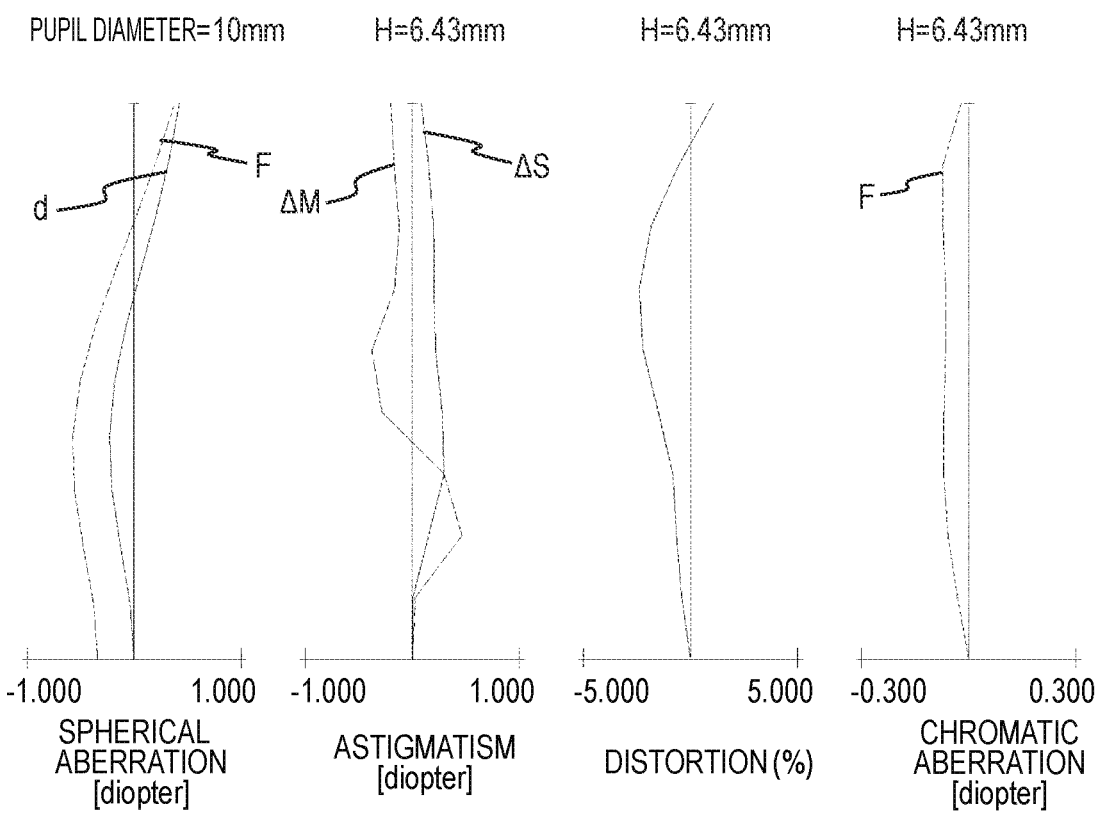
FIG. 14 shows aberration diagrams of the finder optical system according to the observation device of Example 7.

FIG. 14 shows aberration diagrams of a finder optical system according to Example 7 in which the diopter thereof is −1.0.

Figure 15:
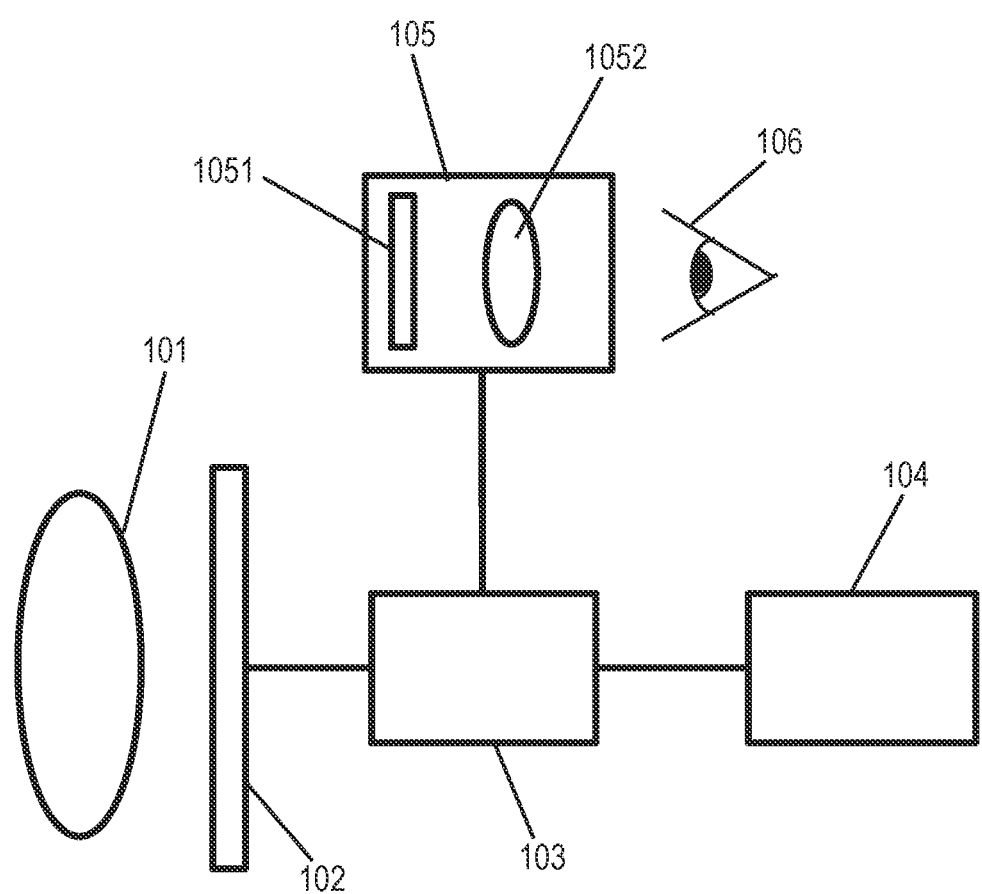
FIG. 15 is a schematic view of a main portion of an image pickup apparatus of the present invention.

FIG. 15 is a schematic view of a main portion of an image pickup apparatus including the observation device of the present invention.

The finder optical system of each example is used for an observation device such as an electronic viewfinder of an image pickup apparatus that is a digital camera, a video camera, or the like. In the lens cross-sectional view, the left side is the image display surface side, while the right side is the observation side (the exit pupil side). In the lens cross-sectional view, L0 represents the finder optical system, Li represents an i-th lens, IP represents an image display surface of an image display element formed of a liquid crystal, an organic EL, or the like, EP represents an observation surface for observation (an eye point) (the exit pupil), and CGI represents a cover glass (a protection member). In FIGS. 3 and 13, Cl represents a reference position for calculation of the observation surface of the finder optical system L0.

Among the aberration diagrams, in a spherical aberration diagram, a solid line d represents a d-line (with a wavelength of 587.6 nm), and a double dotted-dashed line F represents an F-line (with a wavelength of 486.1 nm). In an astigmatism diagram, $\Delta S$ (a solid line) represents a sagittal image plane of the d-line, and $\Delta M$ (a broken line) represents a meridional image plane of the d-line. A distortion is presented about the d-line. A lateral chromatic aberration is presented about the F-line. H represents a half of the diagonal length of the image display surface (the maximum image height).

In order to enlargement-observe a small image display surface (display panel) of the image display element having the diagonal length of 20 mm or less with the viewing angle of 30 degrees or more, the finder optical system is required to have a strong positive refractive power (a power). To accomplish this, it is required to use lenses with a strong positive refractive power or with a strong negative refractive power.

In this case, a spherical aberration, a field curvature, an astigmatism, and a chromatic aberration frequently occur in the finder optical system, and it is difficult to correct these aberrations. Due to the residual aberrations of the spherical aberration, the field curvature, the astigmatism, the chromatic aberration, and so on, the optical performance during observation of the image display surface is deteriorated. In order to improve such aberrations in this case, the finder optical system L0 according to each example has the following configuration. Specifically, the finder optical system L0 according to each example includes a first lens L1 with a positive refractive power, a second lens L2 with a negative refractive power, and a third lens L3 with a positive refractive power arranged in this order from the image display surface (the object surface) IP to the observation surface (the eye point) EP side.

In each example, preferably, a fourth lens with a positive refractive power may be provided on the observation surface side of the third lens.

The finder optical system L0 in the observation device of each example includes the first lens with a positive refractive power, the second lens with a negative refractive power, and the third lens with a positive refractive power arranged in this order from the image display surface IP to the observation EP side. A focal length of the second lens L2 is represented by f2, and a focal length of the finder optical system L0 is represented by f. A curvature radius of a lens surface of the second lens L2 on the image display surface IP side is represented by R21, a curvature radius of a lens surface of the second lens L2 on the observation EP side is represented by R22, and a half of a diagonal length of the image display surface IP is represented by H. In this case, the following conditional expressions are satisfied:

$$-0.70 < f2/f < -0.20 \quad (1);$$

$$0.7 < (R22+R21)/(R22-R21) < 1.4 \quad (2); \text{ and}$$

$$0.31 < H/f < 0.50 \quad (3).$$

Next, technical meanings of the above conditional expressions are described.

The conditional expression (1) defines the focal lengths of the second lens L2 and the entire finder optical system L0. In order to satisfactorily correct an axial chromatic aberration in the finder optical system L0, the negative lens needs to have a strong negative power (refractive power) above a certain level. When the ratio exceeds the upper limit value in the conditional expression (1), it becomes difficult to correct the axial chromatic aberration, and this is not preferable. On the other hand, when the power is weakened such that the ratio falls below the lower limit value in the conditional expression (1), it becomes difficult to correct the various aberrations in the finder optical system L0, and it becomes difficult to obtain good optical characteristics.

The conditional expression (2) defines the lens shape of the second lens L2. When the ratio exceeds the upper limit value in the conditional expression (2), the difference of the curvature radii of the lens surfaces of the second lens L2 between the image display surface IP side and the observation surface EP side becomes too small, and thus the chromatic aberration is not sufficiently corrected. On the other hand, when the ratio falls below the lower limit value in the conditional expression (2), the curvature radius of the lens surface of the second lens L2 on the image display surface IP side becomes too small, and thus it becomes difficult to correct the various aberrations, which is not preferable.

The conditional expression (3) shows a condition required to obtain a wide viewing angle using a small image display element. When the ratio exceeds the upper limit value or falls below the lower limit value in the conditional expression (3), it becomes difficult to obtain a wide viewing angle in the small image display element, thus this is not preferable.

In each example, preferably, one or more of the following conditional expressions are satisfied.

A curvature radius of a lens surface of the first lens L1 on the observation side is represented by R12. A focal length of the first lens L1 is represented by f1. A focal length of the third lens L3 is represented by f3. A curvature radius of a lens surface of the third lens L3 on the image display surface side is represented by R31. The second lens L2 includes at least one aspherical surface. A refractive index on the d-line of the material forming the second lens L2 is represented by nd, and an Abbe number based on the d-line of the material forming the second lens L2 is represented by vd. A length on the optical axis with a diopter of −1 from a lens surface closest to the image display surface in the finder optical system L0 to a lens surface closest to the observation surface EP therein is represented by dL.

In this case, preferably, one or more of the following conditional expressions are satisfied:

$$-8.5 < (R21+R12)/(R21-R12) < -2.0 \quad (4);$$

$$0.30 < f1/f < 1.00 \quad (5);$$

$$0.50 < f3/f1 < 3.10 \quad (6);$$

$$-3.0 < (R31-R22)/(R31+R22) < 10.0 \quad (7);$$

$$1.58 < nd < 1.95 \quad (8);$$

$$15 < vd < 32 \quad (9); \text{ and}$$

$$0.90 < dL/f < 1.65 \quad (10).$$

Next, technical meanings of the above conditional expressions are described.

The conditional expression (4) defines the shape of an air lens formed between the first lens L1 and the second lens L2. In order to correct the lateral chromatic aberration satisfactorily, the ray entering the lens surface of the second lens L2 on the image display surface IP side needs to have a strong incident angle. Thus, preferably, the lens surface of the first lens L1 on the observation surface EP side has a strong power above a certain level. When the ratio exceeds the upper limit value in the conditional expression (4), the power of the lens surface of the first lens L1 on the observation surface EP side becomes insufficient, and it becomes difficult to correct the lateral chromatic aberration. When the ratio falls below the lower limit value in the conditional expression (4), the power of the lens surface of the first lens L1 on the observation surface EP side becomes too strong, and it becomes difficult to correct the various aberrations.

The conditional expression (5) defines the ratio between the focal length of the entire finder optical system L0 and the focal length of the first lens L1. When the ratio falls below the lower limit value in the conditional expression (5), it becomes difficult to obtain a wide viewing angle, thus this is not preferable. When the ratio exceeds the upper limit value in the conditional expression (5), the optical performance becomes deteriorated, thus this is not preferable.

The conditional expression (6) defines the ratio between the focal length of the first lens L1 and the focal length of the third lens L3. When the ratio falls below the lower limit value in the conditional expression (6), it becomes difficult to obtain a wide viewing angle, thus this is not preferable. When the ratio exceeds the upper limit value in the conditional expression (6), the chromatic aberration becomes increased and the optical performance becomes deteriorated, thus this is not preferable.

The conditional expression (7) defines the shape of an air lens formed between the second lens L2 and the third lens L3. When the ratio exceeds the upper limit value or falls below the lower limit value in the conditional expression (7), the lens surface of the second lens L2 on the observation surface EP side and the lens surface of the third lens L3 on the image display surface IP side become too far from each other. This makes it difficult to sufficiently secure the effective range of the third lens L3, and the eye relief becomes short. Thus, this is not preferable.

The conditional expression (8) defines the refractive index of the material forming the second lens L2. When the value falls below the lower limit value in the conditional expression (8), the curvature of the lens surface becomes too strong, and molding thereof becomes difficult. When the value exceeds the upper limit value in the conditional expression (8), the Petzval sum of the finder optical system L0 becomes increased, and the field curvature and the astigmatism become increased. Thus, this is not preferable.

The conditional expression (9) defines the Abbe number of the material forming the second lens L2. When the Abbe number vd of the material forming the second lens L2 becomes small such that the value falls below the lower limit value in the conditional expression (9) and, the chromatic aberration becomes corrected excessively, thus this is not preferable. When the value exceeds the upper limit value in the conditional expression (9), the correction of the chromatic aberration becomes insufficient, thus this is not preferable.

The conditional expression (10) defines the ratio between the optical total length of the finder optical system L0 and the focal length of the entire finder optical system L0. When the ratio exceeds the upper limit value in the conditional expression (10), the positions of the principal points of the finder optical system L0 become far from the image display surface IP, and it becomes difficult to obtain a wide viewing angle. Thus, this is not preferable. When the ratio falls below the lower limit value in the conditional expression (10), it becomes difficult to make the curvature of each lens sufficiently strong, and it becomes difficult to obtain a wide viewing angle. Thus, this is not preferable.

A lens surface herein means a surface having a power. In addition to this, an optical element having no refractive power such as a flat lens may be inserted in front, rear, or middle of the finder optical system.

Preferably, the numerical ranges of the conditional expressions (1) to (10) are replaced with the numerical ranges of the conditional expressions (1a) to (10a):

$$-0.64 < f2/f < -0.30 \tag{1a}$$

$$0.72 < (R22+R21)/(R22-R21) < 1.40 \tag{2a}$$

$$0.31 < H/f < 0.45 \tag{3a}$$

$$-8.0 < (R21+R12)/(R21-R12) < -2.0 \tag{4a}$$

$$0.35 < f1/f < 1.00 \tag{5a}$$

$$0.50 < f3/f1 < 3.08 \tag{6a}$$

$$-3.0 < (R31-R22)/(R31+R22) < 9.0 \tag{7a}$$

$$1.60 < nd < 1.94 \tag{8a}$$

$$15 < vd < 25 \tag{9a}$$

$$1.10 < dL/f < 1.55 \tag{10a}$$

More preferably, the numerical ranges of the conditional expressions (1) to (10) are replaced with the numerical ranges of the conditional expressions (1b) to (10b):

$$-0.64 < f2/f < -0.31 \tag{1b}$$

$$< (R22+R21)/(R22-R21) < 1.38 \tag{2b}$$

$$0.31 < H/f < 0.40 \tag{3b}$$

$$-7.8 < (R21+R12)/(R21-R12) < -2.2 \tag{4b}$$

$$0.40 < f1/f < 0.95 \tag{5b}$$

$$0.60 < f3/f1 < 3.06 \tag{6b}$$

$$-2.0 < (R31-R22)/(R31+R22) < 8.0 \tag{7b}$$

$$1.60 < nd < 1.93 \tag{8b}$$

$$19 < vd < 24 \tag{9b}$$

$$1.10 < dL/f < 1.50 \tag{10b}$$

The finder optical system L0 of each example includes a mechanism that enables diopter adjustment. In Examples 1, 3, 4, 5, and 6, the diopter is adjusted by moving the first lens L1 to the third lens L3 integrally in the optical axis direction while the lens closest to the observation surface EP does not move. Since the general optical system of the electronic viewfinder adjusts the diopter by moving all the lenses in the optical axis direction, it is required to insert a protection glass on the observation surface EP side of the last lens in the context of dust prevention. On the other hand, when the diopter is adjusted while the lens closest to the observation surface EP does not move, no protection glass is required, and the finder optical system L0 can be downsized. Thus, this is preferable. Additionally, with no protection glass inserted, appearance of a ghost due to the reflection of the protection glass can be prevented, and it is preferable in this context as well.

Preferably, the finder optical system L0 of each example includes the first lens L1 with a positive refractive power, the second lens L2 with a negative refractive power, the third lens L3 with a positive refractive power, and the fourth lens L4 with a positive refractive power arranged in this order from the image display surface IP side to the observation surface EP side. This configuration makes it possible to correct the various aberrations satisfactorily, and this is preferable.

Next, an embodiment of an image pickup apparatus using the observation device of each example is described with reference to FIG. 15. An object image formed by an image pickup optical system 101 is converted to an electric signal by an image pickup element 102, which is a photoelectric conversion element. A CCD sensor, a CMOS sensor, or the like may be used as the image pickup element 102.

The output signal from the image pickup element 102 is processed by an image processing circuit 103, and an image is formed. The thus-formed image is recorded in a recording medium 104 such as a semiconductor memory, a magnetic tape, or an optical disc. The image formed by the image processing circuit 103 is displayed in a finder optical system unit 105. The finder optical system unit 105 includes an image display element 1051 and a finder optical system 1052 of each example. The image display element 1051 is formed of a liquid crystal display element LCD, an organic EL element, or the like.

As described above, with the finder optical system of the present invention applied to an image pickup apparatus such as a digital camera or a video camera, it is possible to obtain an image pickup apparatus that has a small size with a wide viewing angle and high optical performance.

Numerical data for each of the examples of the present invention is shown below. In the numerical data, in the order from the image display surface IP to the observation side EP, "ri" represents a paraxial curvature radius of an i-th surface. r1 and r2 are surfaces of the image display element, and r1 is the image display surface. r3 and r4 are surfaces of the protection member CGI. The last surface is the observation surface EP. di represents an on-axis surface distance between an i-th surface and an i+1-th surface in the order from the image display surface IP. Additionally, ndi represents a refractive index of material between an i-th surface and an i+1-th surface with respect to the d-line (wavelength=578.6 nm), and vdi represents the Abbe number of the material between an i-th surface and an i+1-th surface with respect to the d-line.

A unit of the length used in the numerical data is [mm] unless otherwise stated. However, since the finder optical system can obtain similar optical performance even in proportional enlargement or proportional reduction, the unit is not limited to [mm], and any other suitable unit can be used. A surface with the index of "*" written in the column of the curvature radius in the numerical data is an aspheric surface shape defined based on the following expression:

$$X = \frac{h^2/R}{1 + \sqrt{1-(1+k)(h/R)^2}} + A4h^4 + A6h^6 + A8h^8 + A10h^{10}$$

In the above expression, X is a distance in the optical axis direction from the vertex of the lens surface, h is a height in a direction perpendicular to the optical axis, R is a paraxial curvature radius at the vertex of the lens surface, k is a conical constant, A4, A6, A8, and A10 are polynomial coefficients. In an aspheric surface coefficient, "E–i" represents an index expression with the base of 10, that is, "$10^{-i}$." The calculation results of the above-described conditional expressions using the numerical data are shown in Table 1.

Numerical data 1
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 28.759 | 5.49 | 1.5348 | 55.7 |
| 6 | −9.016* | 2.25 | — | — |
| 7 | −6.750* | 1.90 | 1.6510 | 21.5 |
| 8 | 500.000 | 0.30 | — | — |
| 9 | 500.000 | 6.22 | 1.8820 | 37.2 |
| 10 | −12.694* | (variable) | — | — |
| 11 | −37.112 | 2.68 | 1.4917 | 57.4 |
| 12 | −24.664* | 23.00 | — | — |
| 13 | ∞ | — | — | — |

(Various data)

| Diopter | −4 | −1 | 0 | +2 |
|---|---|---|---|---|
| Focal length | 17.77 | 17.64 | 17.61 | 17.53 |
| d4 | 0.80 | 1.83 | 2.12 | 2.76 |
| d10 | 2.26 | 1.23 | 0.94 | 0.30 |

(Aspheric surface data)

| | | |
|---|---|---|
| 6th surface | K | −5.568E+00 |
| | A4 | −2.901E−04 |
| | A6 | 2.711E−06 |
| | A8 | 0.000E+00 |
| | A10 | 0.000E+00 |
| 7th surface | K | −3.409E+00 |
| | A4 | −6.069E−04 |
| | A6 | 5.492E−06 |
| | A8 | −2.365E−08 |
| | A10 | 1.639E−11 |
| 10th surface | K | −1.132E+00 |
| | A4 | 1.869E−05 |
| | A6 | −1.957E−07 |
| | A8 | 1.976E−09 |
| | A10 | −6.316E−12 |
| 12th surface | K | 0.000E+00 |
| | A4 | −3.603E−05 |
| | A6 | 0.000E+00 |
| | A8 | 0.000E+00 |
| | A10 | 0.000E+00 |

Numerical data 2
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 30.304 | 5.70 | 1.5348 | 55.7 |
| 6 | −10.014 | 2.53 | — | — |
| 7 | −7.109* | 1.90 | 1.6510 | 21.5 |
| 8 | −87.372 | 0.32 | — | — |
| 9 | −74.632 | 5.13 | 1.8820 | 37.2 |
| 10 | −12.928* | 0.30 | — | — |
| 11 | −27.934 | 3.06 | 1.4917 | 57.4 |
| 12 | −18.082* | (variable) | — | — |
| 13 | ∞ | 24.20 | — | — |
| 14 | ∞ | — | — | — |

(Various data)

| Diopter | −4 | −1 | 0 | +2 |
|---|---|---|---|---|
| Focal length | 18.86 | 18.86 | 18.86 | 18.86 |
| d4 | 1.77 | 2.99 | 3.33 | 4.05 |
| d12 | 2.58 | 1.36 | 1.02 | 0.30 |

(Aspheric surface data)

| | | |
|---|---|---|
| 6th surface | K | −2.116E+00 |
| | A4 | −9.295E−06 |
| | A6 | 3.036E−07 |
| | A8 | 0.000E+00 |
| | A10 | 0.000E+00 |
| 7th surface | K | −1.326E+00 |
| | A4 | −1.303E−04 |
| | A6 | 4.463E−07 |
| | A8 | −9.594E−09 |
| | A10 | 3.399E−12 |
| 10th surface | K | −2.888E+00 |
| | A4 | −1.052E−04 |
| | A6 | 7.056E−07 |
| | A8 | −3.496E−09 |
| | A10 | 1.109E−11 |
| 12th surface | K | 0.000E+00 |
| | A4 | −2.007E−05 |
| | A6 | 0.000E+00 |

(Aspheric surface data)

| | A8 | 0.000E+00 |
|---|---|---|
| | A10 | 0.000E+00 |

Numerical data 3
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 51.148 | 5.70 | 1.8014 | 45.5 |
| 6 | −14.266* | 3.40 | — | — |
| 7 | −6.050* | 1.90 | 1.6510 | 21.5 |
| 8 | −39.526 | 0.30 | — | — |
| 9 | −62.258 | 4.01 | 1.8820 | 37.2 |
| 10 | −13.796* | (variable) | — | — |
| 11 | −277.437 | 3.39 | 1.5348 | 55.7 |
| 12 | −25.343* | 23.00 | — | — |
| 13 | ∞ | — | — | — |

(Various data)

| Diopter | −4 | −1 | 0 | +2 |
|---|---|---|---|---|
| Focal length | 19.73 | 19.26 | 19.13 | 18.90 |
| d4 | 2.28 | 3.85 | 4.29 | 5.10 |
| d10 | 3.11 | 1.54 | 1.11 | 0.30 |

(Aspheric surface data)

| 6th surface | K | −6.200E−01 |
|---|---|---|
| | A4 | 6.389E−05 |
| | A6 | −1.916E−07 |
| | A8 | 0.000E+00 |
| | A10 | 0.000E+00 |
| 7th surface | K | −1.481E+00 |
| | A4 | −5.934E−05 |
| | A6 | 1.082E−06 |
| | A8 | −1.767E−08 |
| | A10 | 9.673E−11 |
| 10th surface | K | −1.569E+00 |
| | A4 | 4.327E−05 |
| | A6 | −8.443E−08 |
| | A8 | −5.940E−10 |
| | A10 | 3.680E−12 |
| 12th surface | K | 0.000E+00 |
| | A4 | 8.877E−06 |
| | A6 | 0.000E+00 |
| | A8 | 0.000E+00 |
| | A10 | 0.000E+00 |

Numerical data 4
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 17.677 | 4.68 | 1.5348 | 55.7 |
| 6 | −13.331* | 3.18 | — | — |
| 7 | −5.474* | 1.90 | 1.6510 | 21.5 |
| 8 | 51.687 | 0.30 | — | — |
| 9 | 18.072 | 6.60 | 1.8820 | 37.2 |
| 10 | −12.423 | (variable) | — | — |
| 11 | 19.845 | 3.53 | 1.4917 | 57.4 |
| 12 | 17.895* | 23.00 | — | — |
| 13 | ∞ | — | — | — |

(Various data)

| Diopter | −4 | −1 | 0 | +2 |
|---|---|---|---|---|
| Focal length | 16.11 | 16.13 | 16.13 | 16.14 |
| d4 | 0.80 | 1.64 | 1.88 | 2.41 |
| d10 | 1.92 | 1.07 | 0.83 | 0.30 |

(Aspheric surface data)

| 6th surface | K | −1.511E+01 |
|---|---|---|
| | A4 | −3.626E−04 |
| | A6 | 3.676E−07 |
| | A8 | 4.016E−08 |
| | A10 | 2.847E−10 |
| 7th surface | K | −8.205E−01 |
| | A4 | 6.553E−05 |
| | A6 | 9.571E−06 |
| | A8 | −5.137E−08 |
| | A10 | 3.464E−10 |
| 10th surface | K | −9.854E−01 |
| | A4 | 1.498E−04 |
| | A6 | 2.644E−06 |
| | A8 | −3.043E−08 |
| | A10 | 1.147E−10 |
| 12th surface | K | 0.000E+00 |
| | A4 | −8.612E−05 |
| | A6 | 0.000E+00 |
| | A8 | 0.000E+00 |
| | A10 | 0.000E+00 |

Numerical data 5
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 86.958 | 5.70 | 1.5348 | 55.7 |
| 6 | −10.312* | 2.66 | — | — |
| 7 | −7.606* | 2.04 | 1.6510 | 21.5 |
| 8 | −223.611 | 0.30 | — | — |
| 9 | 429.599 | 6.60 | 1.8820 | 37.2 |
| 10 | −15.040* | (variable) | — | — |
| 11 | −56.734 | 2.45 | 1.4917 | 57.4 |
| 12 | −31.623* | 23.00 | — | — |
| 13 | ∞ | — | — | — |

(Various data)

| Diopter | −4 | −1 | 0 | +2 |
|---|---|---|---|---|
| Focal length | 21.67 | 21.44 | 21.38 | 21.25 |
| d4 | 2.58 | 4.20 | 4.62 | 5.58 |
| d10 | 3.30 | 1.69 | 1.26 | 0.30 |

(Aspheric surface data)

| | | |
|---|---|---|
| 6th surface | K | −3.294E+00 |
| | A4 | −7.628E−05 |
| | A6 | 2.717E−07 |
| | A8 | 0.000E+00 |
| | A10 | 0.000E+00 |
| 7th surface | K | −1.217E+00 |
| | A4 | 9.753E−05 |
| | A6 | −3.074E−06 |
| | A8 | 2.442E−08 |
| | A10 | −8.684E−11 |
| 10th surface | K | −2.827E+00 |
| | A4 | −4.426E−05 |
| | A6 | 2.231E−08 |
| | A8 | 5.293E−10 |
| | A10 | −1.571E−12 |
| 12th surface | K | 0.000E+00 |
| | A4 | −1.150E−05 |
| | A6 | 0.000E+00 |
| | A8 | 0.000E+00 |
| | A10 | 0.000E+00 |

Numerical data 6
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 17.597 | 5.40 | 1.6500 | 55.7 |
| 6 | −6.513 | 1.37 | — | — |
| 7 | −5.000* | 1.90 | 1.6510 | 21.5 |
| 8 | 38.280 | 2.64 | — | — |
| 9 | −50.658 | 6.60 | 1.6889 | 31.2 |
| 10 | −13.301 | (variable) | — | — |
| 11 | 35.024 | 2.82 | 1.4917 | 57.4 |
| 12 | −112.158* | 23.00 | — | — |
| 13 | ∞ | — | — | — |

(Various data)

| Diopter | −4 | −1 | 0 | +2 |
|---|---|---|---|---|
| Focal length | 20.20 | 19.72 | 19.60 | 19.34 |
| d4 | 0.79 | 2.35 | 2.75 | 3.72 |
| d10 | 3.23 | 1.67 | 1.26 | 0.30 |

(Aspheric surface data)

| | | |
|---|---|---|
| 6th surface | K | −5.788E+00 |
| | A4 | 1.890E−06 |
| | A6 | 2.288E−06 |
| | A8 | −9.202E−08 |
| | A10 | 1.060E−09 |
| 7th surface | K | −4.699E+00 |
| | A4 | 9.666E−05 |
| | A6 | −9.420E−06 |
| | A8 | 1.368E−07 |
| | A10 | −4.181E−10 |
| 10th surface | K | −6.268E+00 |
| | A4 | −1.915E−04 |
| | A6 | 7.243E−07 |
| | A8 | 0.000E+00 |
| | A10 | 0.000E+00 |
| | K | 1.158E+02 |
| | A4 | −2.404E−04 |
| 12th surface | A6 | 2.595E−07 |
| | A8 | 0.000E+00 |
| | A10 | 0.000E+00 |

Numerical data 7
[Unit: mm]

(Surface data)

| Surface number | r | d | nd | vd |
|---|---|---|---|---|
| 1 | (Image display surface) | 0.70 | 1.5210 | 65.1 |
| 2 | ∞ | 4.00 | — | — |
| 3 | ∞ | 0.50 | 1.5210 | 65.1 |
| 4 | ∞ | (variable) | — | — |
| 5 | 17.463 | 5.58 | 1.5348 | 55.7 |
| 6 | −7.606* | 2.56 | — | — |
| 7 | −5.305* | 3.87 | 1.9229 | 20.9 |
| 8 | −124.374 | 0.28 | — | — |
| 9 | 26.586 | 6.67 | 1.8820 | 37.2 |
| 10 | −13.092* | (variable) | — | — |
| 11 | ∞ | 23.00 | — | — |
| 12 | ∞ | — | — | — |

Various data

| Diopter | −4 | −1 | 0 | +2 |
|---|---|---|---|---|
| Focal length | 18.87 | 18.87 | 18.87 | 18.87 |
| d4 | 0.78 | 1.94 | 2.27 | 3.00 |
| d10 | 3.15 | 1.99 | 1.66 | 0.93 |

(Aspheric surface data)

| | | |
|---|---|---|
| 6th surface | K | −1.131E+01 |
| | A4 | −8.630E−06 |
| | A6 | 1.001E−07 |
| | A8 | 0.000E+00 |
| | A10 | 0.000E+00 |
| 7th surface | K | −6.460E+00 |
| | A4 | −1.245E−03 |
| | A6 | 2.759E−05 |
| | A8 | −2.863E−07 |
| | A10 | 1.188E−09 |
| 10th surface | K | −1.007E+01 |
| | A4 | −2.248E−04 |
| | A6 | 3.591E−06 |
| | A8 | −2.224E−08 |
| | A10 | 5.310E−11 |

TABLE 1

|  | Conditional expression | | | | | | | | |
|---|---|---|---|---|---|---|---|---|---|
| 1<br>f2/f | 2<br>(R22 + R21)/<br>(R22 − R21) | 3<br>H/f | 4<br>(R21 + R12)/<br>(R21 − R12) | 5<br>f1/f | 6<br>f3/f1 | 7<br>(R31 − R22)/<br>(R31 + R22) | 8<br>nd | 9<br>vd | 10<br>dL/f |
| Example 1 −0.580 | 0.973 | 0.365 | −6.957 | 0.768 | 1.044 | 0.000 | 1.6510 | 21.5 | 1.24 |
| Example 2 −0.636 | 1.177 | 0.341 | −5.895 | 0.785 | 1.153 | −0.079 | 1.6510 | 21.5 | 1.18 |
| Example 3 −0.587 | 1.361 | 0.336 | −2.473 | 0.757 | 1.336 | 0.223 | 1.6510 | 21.5 | 1.26 |
| Example 4 −0.465 | 0.808 | 0.316 | −2.393 | 0.930 | 0.619 | −0.482 | 1.6510 | 21.5 | 1.42 |
| Example 5 −0.568 | 1.070 | 0.393 | −6.621 | 0.823 | 0.943 | 3.171 | 1.6510 | 21.5 | 1.20 |
| Example 6 −0.341 | 0.769 | 0.328 | −7.609 | 0.409 | 3.045 | 7.185 | 1.6510 | 21.5 | 1.26 |
| Example 7 −0.323 | 1.089 | 0.341 | −5.611 | 0.569 | 1.005 | −1.544 | 1.9229 | 20.9 | 1.21 |

Although the preferable embodiments of the present invention are described above, the present invention is not limited to such embodiments, and various modifications and variations can be made within the scope of the gist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226995, filed Dec. 4, 2018, which is hereby incorporated by reference herein in its entirety.

What is claimed is:

1. An observation device, comprising:
an image display element that displays an image; and
a finder optical system that is used for observing the image displayed on an image display surface of the image display element, wherein
the finder optical system includes a first lens with a positive refractive power, a second lens with a negative refractive power, a third lens with a positive refractive power, and a fourth lens with a positive refractive power arranged in this order from an image display surface side to an observation side,
wherein the observation device further comprises a cover glass arranged at the image display surface side of the first lens,
wherein an air interval on an optical axis between the cover glass and the image display surface is larger than an air interval on the optical axis between the cover glass and the first lens,
wherein the fourth lens does not move during a diopter adjustment, and wherein
the following conditional expressions are satisfied:

$-0.70 < f2/f < -0.20;$ $0.7 < (R22+R21)/(R22-R21) \leq 1.361;$ $0.31 < H/f < 0.50;$ $-8.5 < (R21+R12)/(R21-R12) < -2.0$ $0.619 \leq f3/f1 < 3.10;$ and $-0.482 \leq (R31-R22)/(R31+R22) \leq 0.223,$ where f2 is a focal length of the second lens, f is a focal length of the finder optical system, R21 is a curvature radius of a lens surface of the second lens on the image display surface side, R22 is a curvature radius of a lens surface of the second lens on the observation side, H is a half of a diagonal length of the image display surface, R12 is a curvature radius of a lens surface of the first lens on the observation side, f1 is a focal length of the first lens, f3 is a focal length of the third lens, and R31 is a curvature radius of a lens surface of the third lens on the image display surface side.

2. The observation device according to claim 1, wherein the following conditional expression is satisfied:

$0.30 < f1/f < 1.00$

.

3. The observation device according to claim 1, wherein the second lens includes at least one aspherical surface, and
the following conditional expressions are satisfied:

$1.58 < nd < 1.95;$ and $15 < vd < 32,$ where nd is a refractive index on a d-line of a material forming the second lens, and vd is an Abbe number based on the d-line of the material forming the second lens.

4. The observation device according to claim 1, wherein the following conditional expression is satisfied:

$0.90 < dL/f < 1.65,$ where dL is a length on the optical axis with a diopter of −1 from a lens surface closest to the image display surface in the finder optical system to a lens surface closest to the observation side in the finder optical system.

5. An image pickup apparatus, comprising:
an image pickup element;
an image display element that displays an image obtained by the image pickup element; and
a finder optical system that is used for observing the image displayed on the image display element, wherein
the finder optical system includes a first lens with a positive refractive power, a second lens with a negative refractive power, a third lens with a positive refractive power, and a fourth lens with a positive refractive power arranged in this order from an image display surface side to an observation side, wherein the image pickup apparatus further comprises a cover glass arranged at the image display surface side of the first lens,
wherein an air interval on an optical axis between the cover glass and the image display surface is larger than an air interval on the optical axis between the cover glass and the first lens,
wherein the fourth lens does not move during a diopter adjustment, and wherein the following conditional expressions are satisfied:

$-0.70 < f2/f < -0.20$;

$0.7 < (R22+R21)/(R22-R21) \leq 1.361$;

$0.31 < H/f < 0.50$; and $-8.5 < (R21+R12)/(R21-R12) < -2.0$ $0.619 \leq f3/f1 < 3.10$; and $-0.482 \leq (R31-R22)/(R31+R22) \leq 0.223$, where f2 is a focal length of the second lens, f is a focal length of the finder optical system, R21 is a curvature radius of a lens surface of the second lens on the image display surface side, R22 is a curvature radius of a lens surface of the second lens on the observation side, H is a half of a diagonal length of the image display surface, R12 is a curvature radius of a lens surface of the first lens on the observation side, f1 is a focal length of the first lens, f3 is a focal length of the third lens, and R31 is a curvature radius of a lens surface of the third lens on the image display surface side.

* * * * *